July 21, 1959     A. P. HOPE     2,895,450
SYSTEM FOR MOVING LIQUIDS
Filed March 1, 1956     2 Sheets-Sheet 1
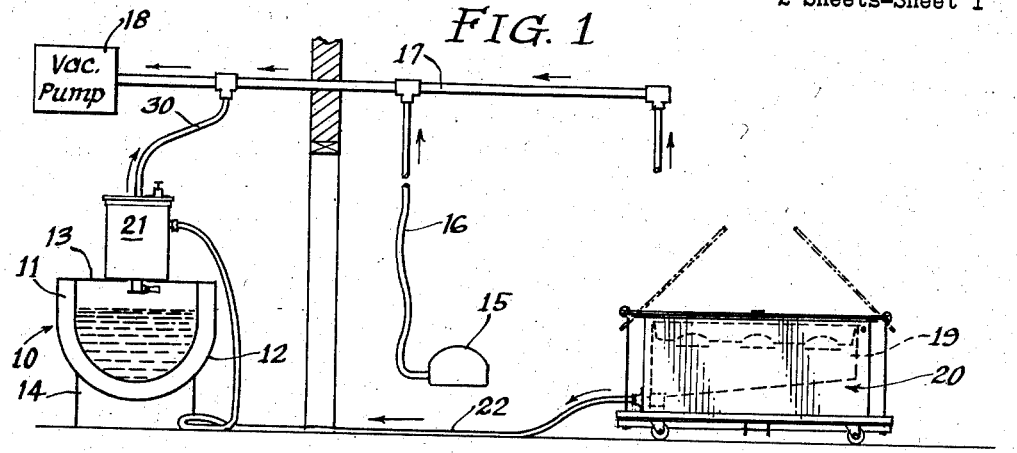
FIG. 1
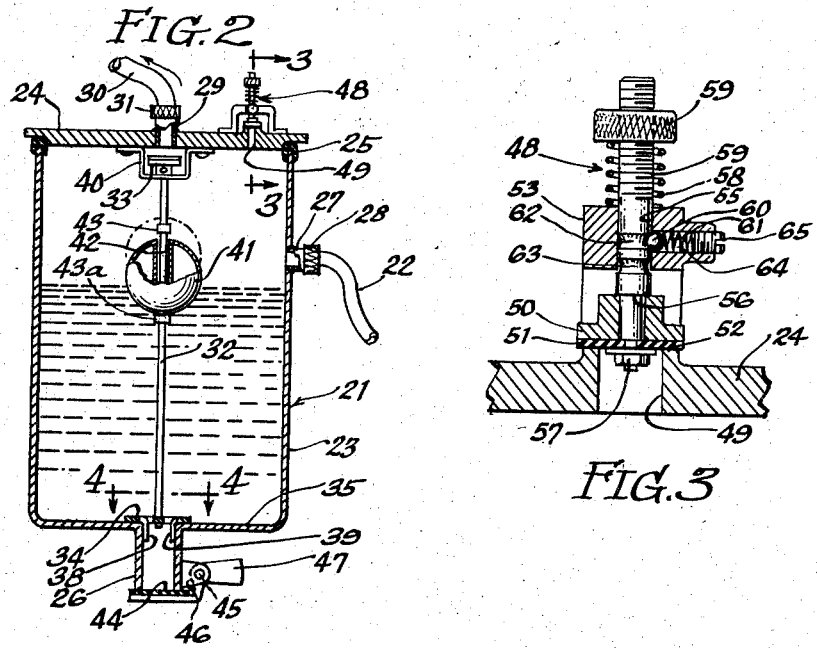
FIG. 2
FIG. 3
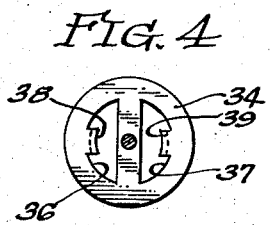
FIG. 4
INVENTOR.
Alfred Paul Hope
BY
Charles J. Vajtech
Attorney

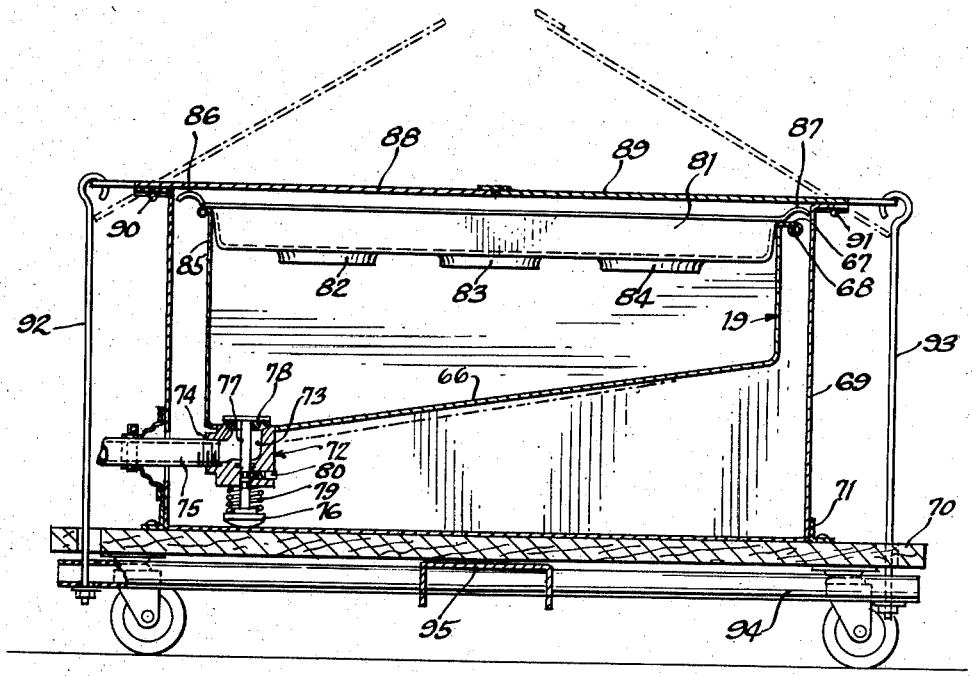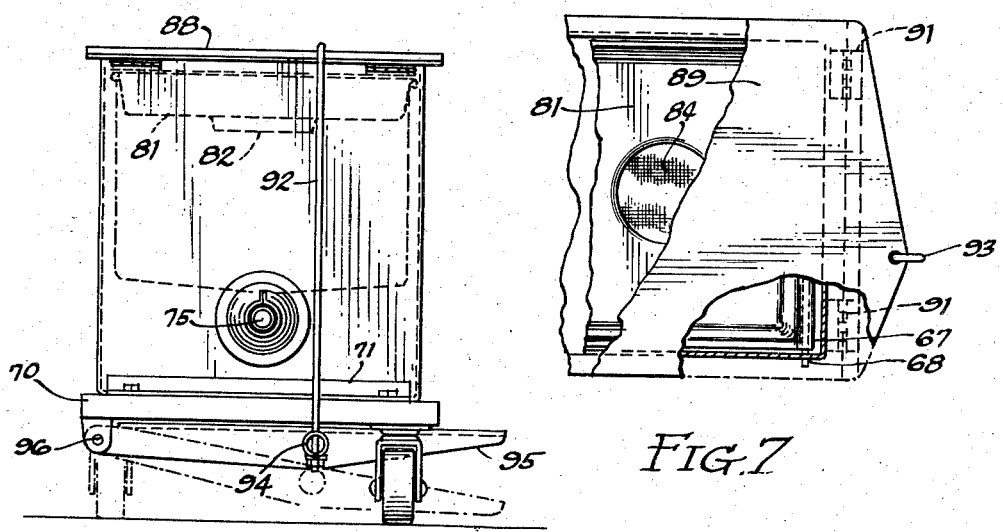

United States Patent Office 2,895,450
Patented July 21, 1959

2,895,450
SYSTEM FOR MOVING LIQUIDS
Alfred Paul Hope, South Haven, Mich.

Application March 1, 1956, Serial No. 568,721

11 Claims. (Cl. 119—14.05)

This invention relates to a system of moving liquids and particularly for moving milk from a stanchion in a barn or other milking station to a tank located in the milk house.

The efficiency of handling milk from the stanchion to the diary or milk processor can be greatly enhanced by the elimination of the well known ten gallon milk cans into which the farmer generally places the milk for pick up by the dairy or processor, and by the substitution for such cans of a single refrigerated bulk tank in the milk house from which the milk is transferred by a pump and pipe line to a pick up tank truck for delivery to the diary or processor. The bulk tank storage and tank truck eliminate the need for carrying the milk to the pickup truck at the farm and from the pickup truck to the dairy, and also provide the highly desirable instant cooling of the milk.

The bulk storage tank, however, is chiefly of benefit to the dairy since the farmer must still carry the milk from the stanchions to the bulk storage tank. If he has sufficient labor for this operation, he, of course, has sufficient labor to handle the milk in the ten-gallon cans up to the dairy pickup truck. As an adjunct to the bulk storage tank system, therefore, it has been proposed to provide glass pipe lines in barns with suitable pumping means for transporting the milk from the stanchions to the bulk storage tank through such lines. To meet State milk regulations, however, the pump and glass lined pipe must be so constructed that they may be completely disassembled and thoroughly cleaned after each use. It has been found that although the bulk storage tank itself is expensive, the pipe line, pump and cleaning apparatus necessary for transferring the milk from the milker at the stanchions to the bulk storage tank is even more expensive, so that the outlay facing a farmer for the bulk storage tank and pipe line system is prohibitive except for large dairy operations.

The principal object of this invention is to provide a simple and inexpensive system for moving liquids from one point to another and possibly higher point, which system will handle the liquid gently and substantially without contamination.

Another object of this invention is the provision of a system for moving milk from the stanchion in a barn to a bulk storage tank at the farm, which system will be simple and inexpensive to install and to maintain in satisfactorily clean condition.

As a more specific object, this invention seeks the provision of a system for moving milk from the stanchion in a barn to a bulk storage tank at the farm which utilizes energy from the vacuum pump normally available in a barn for operating the milkers, the system being usable concurrently with the operation of the milkers without interfering therewith and without requiring the use of an extra large vacuum pump.

Another specific object of this invention is the provision of a mobile tank unit in the barn into which the milkers are emptied, a small intermediate tank located above the bulk storage tank so as to drain readily thereinto by gravity, with flexible hose means connecting the mobile tank with the intermediate tank, and with means for alternately connecting the intermediate tank to the vacuum pump for the milker to draw milk from the mobile tank to the intermediate tank, and to atmosphere to allow the intermediate tank to drain into the bulk storage tank.

These and other objects of this invention will become apparent from the following detailed description when taken together with the accompanying drawings in which, Fig. 1 is a schematic assembly of the components of a liquid moving system incorporating this invention;

Fig. 2 is an enlarged vertical section through the intermediate tank of the system;

Fig. 3 is a still further enlarged section through the atmospheric valve used on the intermediate tank;

Fig. 4 is an enlarged view of the bottom support for the float valve of the intermediate tank taken in the direction of the arrows 4—4 of Fig. 2;

Fig. 5 is an enlarged side elevational view of the mobile tank of the system;

Fig. 6 is an end elevational view of the mobile tank of Fig. 5 looking to the right in that figure; and Fig. 7 is a fragmentary plan view of the mobile tank.

The complete milk transporting system as shown in Fig. 1 comprises a milk cooler 10 which may be of any known construction and preferably is in the form of a stainless steel tank 11 having a jacket 12 through which a cooling medium is circulated, and having a cover 13 which is removable in any suitable manner to give access to the interior of the tank. Said tank is permanently mounted on a stand 14. The tank 10 is generally placed in a separate room either adjoining the barn where State laws so permit, or else in a separate building preferably located near the barn.

Most modern barns are equipped at present with one or more milkers, one of which is shown schematically at 15 and is comprised of a container having a hose connection 16 to a vacuum line 17 running through the barn and to a vacuum pump 18 which, for convenience in servicing, may be disposed in the room in which tank 10 is located. The milkers may take any desired known form and will not be shown in detail herein.

Milk from the milkers 15 is emptied by the dairyman into a container 19 mounted in a cart 20 which cart is so constructed as to completely enclose the container to protect the contents from contamination. The cart may be wheeled from place to place in the barn and the details of its construction will be described hereinafter.

The milk in the container 19 is moved to tank 10 by the novel vacuum operated mechanism shown schematically at 21 to which it is connected by a flexible hose 22, preferably of readily cleaned material such as one of the well known and readily available plastic garden hoses. It is contemplated that when the transporting mechanism is in operation, the attendant in the barn merely empties the milkers 15 into container 19, the cart being wheeled from place to place behind the cows to minimize the amount of walking and carrying that the attendant must do, and the container will be automatically emptied by the mechanism 21 and the contents carried to, and then dropped into, the tank 10. The details of construction of the vacuum-operated mechanism 21 will now be described.

Referring to Fig. 4, the vacuum-operated milk transporting mechanism is comprised of a corrosion resistant intermediate container 23 having a removable cover 24 which may be sealed with respect to the container 23 by a suitable removable gasket 25 of resilient and readily cleaned material such as rubber or the like. A drain pipe 26 may be disposed at the bottom and centrally of container 23 through which the contents of the container may fall by gravity into tank 10. Container 23 is also provided with an inlet opening 27 in one side thereof and with a hose coupling 28 by which hose 22 may be readily attached to and disconnected from the said side opening 27. Immediately over the drain pipe 26 in cover 24 is a vacuum inlet pipe 29 which communicates with the interior of the container and which may be connected by a flexible hose 30 to vacuum line 17, a suitable coupling 31 being provided on hose 34 to make it possible to connect and disconnect the hose quickly when the cover is to be cleaned.

Between drain 26 and vacuum inlet pipe 29 is a rod 32 having a valve 33 mounted on the upper end thereof which is adapted to close the vacuum inlet pipe when the rod is in a raised position. For purposes of illustration, valve 33 is shown as a flat valve, but other forms of valves may be used if desired. A disc-shaped support 34 is secured to the lower end of rod 32 and is adapted to rest upon the bottom 35 of tank 23 to support the rod and valve from the container bottom 35 when the valve is in the open condition shown in Fig. 2. As shown more clearly in Fig. 4, the disc-shaped support 34 is preferably provided with perforations 36 and 37 to permit free flow of milk past the support during the draining cycle of the mechanism 21, and with downwardly bent tabs 38, 39 which extend into pipe 26 and serve as a guide for the lower end of rod 32 as the rod is raised and lowered to close and open vacuum inlet pipe 29. The upper end of rod 32 extends through a strap 40 secured to the underside of cover 24, the strap serving to guide rod 32 in its movement toward and away from pipe 29.

Movement of rod 32 upward to close vacuum inlet pipe 29 is effected by a float 41 of any suitable configuration and having an opening 42 through which rod 32 extends. Float 41 may move upward on rod 32 until it strikes a stop collar 43, after which rod 32 is compelled to move upward with the float. Thus, if the level of the milk in intermediate container 23 rises above the point where float 41 strikes stop collar 43, rod 32 will be raised and will continue to rise until flat valve 33 engages the inner end of vacuum inlet pipe 29 to close the pipe. Downward movement of the float 41 relative to rod 32 is limited by a stop collar 43a located a short distance below collar 43. For ease of manufacture, float 41 may be fixed to rod 32 by clamping the float between collars 43 and 43a.

Drain pipe 26 is normally closed by a counter-balanced flap valve 44 pivotally mounted at 45 on ears 46 secured to, or formed integrally with, pipe 26. The counter-balancing weight 47 extends laterally from pivot 45 and is sufficiently heavy to hold valve 44 closed under the hydraulic head developed by the milk in container 23 when the level of the milk is high enough to raise float 41 and rod 32 to the point where valve 33 closes the vacuum inlet, and for a small increment of head beyond that as will be hereinafter described. It may be observed that the vacuum in the tank above the liquid normally reduces the effective pressure of the milk upon the valve so that a considerable amount of milk may be introduced into the container without causing the valve 44 to open.

It is contemplated that when valve 33 is closed and valve 44 is open, the milk in container 23 will drain through drain pipe 26, and during such draining cycle, it is necessary to allow air to enter the tank to take the place of the liquid which is leaving it. Accordingly, a spring biased relief valve 48 is provided in cover 24, said valve being disposed over an opening 49 in said cover. As is shown more clearly in Fig. 3, valve 48 may be comprised of a flat valve disc 50 having a suitable soft facing 51 adapted to cooperate with a raised valve seat 52 on cover 24 to form a fluid-tight seal thereat. A U-shaped strap 53, similar in form to strap 40, is mounted on the exterior of cover 24 in a manner to bridge opening 49 and serves as a support for a valve rod 54 adapted to reciprocate in an opening 55 in strap 53. The lower end of rod 55 has a shoulder 56 against which the flat valve disc 50 is held by a suitable nut 57. A spring 58 is compressed between strap 53 and an adjusting nut 59 threaded over the upper end of rod 55.

The position of the valve stem 54 relative to strap 53 is fixed by a ball detent 60 operating in a lateral bore 61 in strap 53 and cooperating with peripheral grooves 62 and 63 in stem 54. Ball 60 is pressed against the stem by a spring 64 the compression of which may be adjusted by the screw 65 so that greater or less resistance may be produced by the ball detent 60 to the vertical movement of rod 54 as desired. It may be noted that spring 58 urges the stem 54 upward and accordingly urges the valve 50 off its seat 52, while the vacuum in the container acts in the opposite direction to seat the valve. It is contemplated that the valve will be opened when the vacuum in the tank falls from approximately 15 inches of mercury to approximately 5 inches, and that once opened it will remain open until the vacuum is again restored to the tank by the reopening of valve 33.

The operation of the valves in the mechanism 21 is as follows:

Assuming that container 23 is empty and that there is no vacuum in the system, rod 32 will be in its lowermost position, that is, the position shown in Fig. 2, wherein valve 33 is open insofar as the lower end of the vacuum inlet pipe 29 is concerned. Valve 44 will be closed because of the torque exerted upon it in a closing direction by counter-weight 47, and valve 48 will be open due to the absence of sufficient vacuum in the container. Assuming now that the vacuum pump is in operation and that there is approximately 15 inches of mercury of vacuum in inlet hose 30, and assuming further for purposes of discussion that the side opening 27 is closed to atmosphere, the interior of tank 23 will experience a drop in pressure until the pressure in the container is substantially equal to the vacuum in the line 30. At this point there will be a tendency for valve 33 to close, but the weight of the rod and of the devices secured thereto is such as to overcome such closing tendency. The reduction in pressure in tank 23 also effects a firmer closing of valve 44.

Assuming now that container 19 in cart 20 has milk therein, the subatmospheric pressure within the tank, combined with the atmospheric pressure on the milk in the container 19, will cause the milk in said container to flow through the hose 22 and through side inlet pipe 27 into tank 23. As this continues, float 41 will gradually rise on rod 32 until it strikes collar 43, whereupon the rod itself will then be moved upwardly until valve 33 closes the pipe 29. At this point the pressure within tank 23 is still substantially 15 inches of mercury, and the milk will accordingly continue to flow into the tank while the pressure in the tank rises (that is, the vacuum decreases) until the pressure is sufficiently great to allow relief valve 48 to be opened against the resistance of detent 60 under the action of spring 58. This immediately restores atmospheric pressure to the interior of the tank and increases the effective head of the liquid upon valve 44 which then opens to allow the milk in container 23 to drain out and into the bulk tank 10 below. The opening of relief valve 48 is accompanied by a transfer of the detent 60 from groove 62 to groove 63, and the detent will hold the valve in its open position while the milk is draining out of container 23. As the milk continues to drain, the weight of rod 32 and float 41 becomes greater due to the loss of buoyancy, and approximately at the point where the tank is completely empty the weight will be sufficiently great to overcome the difference in atmospheric and vacuum pressure acting on valve 33 tending to hold it in its closed position against the end of vacuum inlet pipe 29. At this point the rod will fall, being guided by the tabs 38, 39 sliding on the interior of drain pipe 26, and with the opening of the tank to the vacuum line, the pressure within the tank will immediately begin to decrease until the pressure of spring 58 tending to hold valve 48 in its open position and the resistance of detent 60 are overcome. It may be noted that the opening 49 is of considerably less diameter than the opening provided by vacuum inlet pipe 29 so that the drop in pressure within the tank may readily take place. With valves 48 and 44 closed, and valve 33 open, the filling cycle is repeated and the alternate filling and emptying will continue as long as there is milk in container 19, or at least until the supply of milk in hose 22 continues.

It was assumed in the description of the operation of the vacuum operated mechanism 21 that side opening 27 is closed to atmosphere at the time the filling cycle commences. This, of course, would not be possible but nevertheless it is necessary to avoid a direct opening to atmosphere on side outlet 27 when valve 33 is open, since such direct opening would destroy, or at least greatly reduce, the vacuum pressure in line 17. It is therefore necessary to so arrange cart 20 and its container 19 that whenever the container is empty, side opening 27 will be closed to atmosphere.

Referring now to Figs. 5, 6 and 7, container 19 is comprised of a substantially rectangular stainless steel tank having a sloping bottom 66 and having a hinged connection 67 with a rod 68 extending transversely from side to side of a steel enclosure 69 for container 19 on cart 20. Said steel enclosure may be in the form of a rectangular tank which is suitably supported on the platform 70 of the cart 20 and held in place thereon by angle brackets 71. At the lowermost left hand end of container 19, as viewed in Fig. 5, is a drain valve 72 and an opening 73 therein which conducts the milk to a side outlet 74 in the valve, the latter then being connected to hose 22 by a suitable pipe or hose 75 extending through the steel enclosure 69.

The left-hand end of container 19, as viewed in Fig. 5, is supported from the bottom of the steel enclosure 69 by a relatively large button 76 secured to the lower end of a valve stem 77, said valve stem extending through the body valve 72, and through drain opening 73 to a poppet valve 78 in the interior of container 19 and to which it is secured. A spring 79 is compressed between the body of valve 72 and the upper surface of button 76 and normally tends to pull the valve stem 77 downwardly relative to the body of the valve to hold poppet valve 78 in its closed position relative to drain opening 73. A spring detent 80, similar in construction to the detent 60 in Fig. 3, serves to prevent flutter or hunting in the operation of the valve. It is contemplated that spring 79 will be sufficiently strong to hold valve 78 in its closed position when container 19 is substantially empty, and that as the container is filled the weight of the milk in the container will cause the spring to be compressed and valve 78 to be opened. Spring detent 80 is so disposed relative to the valve stem 77 as to insure the proper positioning of valve 78 in either a fully closed or fully opened position.

It may be apparent from the description thus far given that as container 19 is filled with milk, it will swing downwardly about rod 67 and will compress spring 79 to open valve 78 and allow the contents of the container to be drawn through holes 22 into the vacuum operated mechanism 21 as hereinabove described. When container 19 is empty, however, valve 78 is closed and the vacuum in line 17 is preserved for further milking operations.

The upper or inlet end of container 19 is closed by a tray 81 which may be provided with three openings 82, 83 and 84 through which the milk may be poured. Suitable strainers or filters (not shown) may be placed over the openings to insure the cleanliness of the milk. The exterior of the tray is, of course, open to atmosphere and hence is substantially at atmospheric pressure. Tray 81 may likewise be made of stainless steel and is readily removable so that it may be cleaned and also that access may be had to the interior of tank 19 for similar cleaning purposes. Thus, tray 81 may be provided with a continuous peripheral shoulder 85 which engages the open rim of container 19 and by which the tray is supported, and it may further be provided with handles 86 and 87 by which it may be removed from the cart.

To protect the tray from insects, etc., while the milking operation is in progress, container 69 is provided with overlapping covers 88 and 89, each of which is hingedly mounted at 90 and 91, respectively, to the steel container 69. The covers are connected by pull rods 92 and 93 to a cross bar 94 which, in turn, is connected to a foot pedal 95 hinged at 96 to the bottom of platform 70. Thus, by stepping on pedal 95, cross bar 94 is depressed and rods 92 and 93 are pulled vertically downwardly, thereby causing the hinged covers 88 and 89 to rock about their hinges 90 and 91, respectively, and uncover the tray. The foot pedal permits the operator to use both hands in emptying the milker and also prevents unnecessary contact or handling of the covers and the interior of the tank 69 by the attendant.

As the milk in the cart 20 flows out, a slight vacuum is created between the top of the milk in the cart and the filters in tray 81 which then creates a slight pressure differential across the filters due to the external atmospheric pressure on the filters. This slight pressure differential assists in drawing the milk more rapidly through the filter and prevents an accumulation of milk on tray 81 which would slow up the passage of milk through the system.

It may be apparent from the foregoing description that the mobile container 19, the intermediate container 23 and the connecting hose 22 may be readily disassembled for washing in substantially the same manner as the milkers and that therefore the use of the foregoing system does not involve the expense of special cleaning apparatus. Each component of the system may be made relatively inexpensively, and the entire system may be easily operated by one attendant. Because of the absence of mechanical pumps in contact with the milk, the foregoing system moves the milk gently, without introducing any air bubbles into the milk and without churning the milk into butter.

It is understood that the foregoing description is merely illustrative of a preferred embodiment of the invention and that the scope of the invention is not to be limited thereto but is to be determined by the appended claims.

I claim:

1. A system for transporting milk comprising a vacuum pump, a movable vacuum operated milking machine connected for operation by the vacuum pump, a relatively fixed bulk storage tank for the milk, a portable tank adapted to receive milk from the milking machine, means operated by the vacuum pump and connected to the portable tank for periodically transferring milk from the portable tank to the bulk storage tank, and valve means in the portable tank and operable by the weight of the portable tank and by a predetermined quantity of milk therein for opening the portable tank to the milk transferring means.

2. A system as described in claim 1, said milk transferring means comprising a container removably disposed over the bulk storage tank and having a drain opening at the bottom thereof for emptying such container into the bulk storage tank by gravity, and valve means controlled by the effective head of the milk in the container for controlling the draining of the container into the bulk storage tank.

3. A system for transporting milk comprising a vacuum pump, a movable vacuum operated milk machine connected for operation by the vacuum pump, a relatively fixed bulk storage tank for the milk, a portable tank adapted to receive milk from the milking machine, a transfer tank disposed above and adapted to drain into the bulk storage tank, flexible hose means connecting the transfer tank to the portable tank, valve means for periodically connecting the transfer tank to the vacuum pump, said valve means being operated as a function of the level of milk in the transfer tank, a second valve means for draining the contents of the transfer tank into the bulk storage tank, said second valve means being operable by the effective pressure of the milk in the transfer tank therein to open said valve, and third valve means operable by a predetermined pressure differential between the interior and exterior of the transfer tank to equalize the pressure on the interior and exterior of the transfer tank.

4. A system as described in claim 3, said third valve means including a spring biasing the valve to open position, and detent means acting upon said third valve means to hold the valve in a given position over a range of such pressure differentials.

5. A system for moving liquids such as milk comprising a source of air at substantially constant sub-atmospheric pressure, a portable tank for receiving liquid to be moved a relatively fixed tank for receiving the moved milk, said portable tank having inlet and outlet ends, the inlet end of said portable tank being at substantially atmospheric pressure, container means disposed in dumping relation to the fixed tank, flexible fluid conducting means connecting said outlet end of the portable tank to the container means to conduct fluid from the portable tank to the container means, valve means associated with the container and operated by the liquid in the container means intermittently closing off the source of sub-atmospheric pressure from the interior of the container means, and other valve means in communication with the interior of the container exposing the said interior to the atmosphere to admit air to the said interior to dump the liquid from the container into the fixed tank.

6. A system for moving liquids such as milk comprising a source of air at substantially constant sub-atmospheric pressure, a portable tank for receiving liquid to be moved, a relatively fixed tank for receiving the moved liquid, said portable tank having inlet and outlet ends, the inlet end of said portable tank being at substantially atmospheric pressure, container means disposed in dumping relation to the fixed tank, flexible fluid conducting means connecting said outlet end of the portable tank to the container means to conduct the liquid from the portable tank to the container means, valve means in the container means operated as a function of the quantity of liquid in the container shutting off the contents of the container to the source of sub-atmospheric pressure to reduce the pressure differential between the interior and exterior of the container, other valve means disposed above the liquid in the container opening the contents of the container to atmospheric pressure, and resilient means constantly urging said other valve means to open position, said resilient means opening said other valve means upon the establishment of a pressure differential between the interior and exterior of the container which is less than that established by the said substantially constant sub-atmospheric pressure.

7. A system for moving liquids such as milk comprising a source of air at substantially constant subatmospheric pressure, a portable tank for receiving liquid to be moved, a relatively fixed tank for receiving the moved liquid, said portable tank having inlet and outlet ends, the inlet end of said portable tank being at substantially atmospheric pressure, container means for the moved liquid, said fixed tank being in a liquid-receiving relationship to the container means, flexible liquid-conducting means connected to the outlet of the portable tank and to the container means to conduct the liquid from the portable tank to the container means, and liquid-responsive control means associated with said container and connecting the interior of the container alternately to the said source of air at substantially constant sub-atmospheric pressure, and to air at substantially atmospheric pressure for conditioning the container to pass liquid from the container to the fixed tank.

8. A system for moving liquids such as milk comprising a source of air at substantially constant sub-atmospheric pressure, a portable tank for receiving liquid to be moved, a relatively fixed tank for receiving the moved liquid, said portable tank having inlet and outlet ends, the inlet end of said portable tank being at substantially atmospheric pressure, container means for the moved liquid, said container means being disposed in dumping relation to the fixed tank, flexible liquid-conducting means connected to the outlet of the portable tank and to the container means to conduct the liquid from the portable tank to the container means, and liquid-responsive control means associated with said container and connecting the interior of the container alternately to the said source of air at substantially constant sub-atmospheric pressure and to air at substantially atmospheric pressure for conditioning the container to pass liquid intermittently from the container to the fixed tank.

9. A system for moving liquids such as milk, comprising a source of air at substantially constant subatmospheric pressure, a portable tank for receiving liquid to be moved, a relatively fixed tank for receiving the moved liquid, said portable tank having inlet and outlet ends, the inlet end of said portable tank being at substantially atmospheric pressure, container means for the moved liquid, said fixed tank being in a liquid-receiving relationship to the container means, means defining with the outlet end of the portable tank a liquid-conducting passage connecting the portable tank to the container means, valve means associated with said passage controlling the flow of liquid through said passage, and liquid-responsive control means associated with the container and connecting the interior of the container alternately to the source of air at sub-atmospheric pressure and to air at substantially atmospheric pressure for conditioning the container to pass liquid from the container to the fixed tank.

10. A system as described in claim 9, said valve means associated with said passage constituting a liquid weight controlled valve responsive to the presence of a predetermined quantity of liquid in the portable tank to open the outlet end of the portable tank to the said passage.

11. A system for moving liquids such as milk comprising a source of air at substantially constant subatmospheric pressure, a portable tank for receiving liquid to be moved, a relatively fixed tank for receiving the moved liquid, said portable tank having inlet and outlet ends, the inlet end of said portable tank being at substantially atmospheric pressure, a filter extending across the said inlet end, container means for the moved liquid, said fixed tank being disposed in a liquid-receiving relationship to the container means, flexible liquid-conducting means connected to the outlet of the portable tank and to the container means to conduct the fluid from the portable tank to the container means, and liquid-responsive control means associated with said container and connecting the interior of the container alternately to the said source of air at substantially constant sub-atmospheric pressure and to air at substantially atmospheric pressure for conditioning the container to pass liquid from the container to the fixed tank.

(References on following page)

References Cited in the file of this patent

UNITED STATES PATENTS

| | | |
|---|---|---|
| 807,547 | Fliegel | Dec. 19, 1905 |
| 1,172,584 | Conrad | Feb. 22, 1916 |
| 1,893,978 | Barnard et al. | Jan. 10, 1933 |
| 2,015,127 | Rieger | Sept. 24, 1935 |
| 2,281,146 | Fayman | Apr. 28, 1942 |
| 2,702,019 | Duncan | Feb. 15, 1955 |
| 2,733,667 | Hill | Feb. 7, 1956 |
| 2,739,609 | Morris | Mar. 27, 1956 |
| 2,740,378 | Duncan | Apr. 3, 1956 |

FOREIGN PATENTS

| | | |
|---|---|---|
| 110,047 | Australia | Mar. 7, 1940 |
| 584,032 | Great Britain | Jan. 6, 1947 |